United States Patent
Tao et al.

(10) Patent No.: US 11,010,111 B2
(45) Date of Patent: May 18, 2021

(54) IMAGE FORMING APPARATUS INCLUDING A CONSTANT LOG STORAGE

(71) Applicants: Satoru Tao, Kanagawa (JP); Satoru Komatsubara, Kanagawa (JP); Satoru Ohno, Tokyo (JP); Hiroaki Nagata, Kanagawa (JP)

(72) Inventors: Satoru Tao, Kanagawa (JP); Satoru Komatsubara, Kanagawa (JP); Satoru Ohno, Tokyo (JP); Hiroaki Nagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/814,276

(22) Filed: Mar. 10, 2020

(65) Prior Publication Data

US 2020/0293243 A1 Sep. 17, 2020

(30) Foreign Application Priority Data

Mar. 12, 2019 (JP) .............................. JP2019-045257

(51) Int. Cl.
*G06F 13/28* (2006.01)
*G06F 3/12* (2006.01)
(Continued)

(52) U.S. Cl.
CPC .......... *G06F 3/1229* (2013.01); *G06F 3/1221* (2013.01); *G06F 13/28* (2013.01);
(Continued)

(58) Field of Classification Search
None
See application file for complete search history.

(56) References Cited

U.S. PATENT DOCUMENTS

| 5,666,625 A | 9/1997 | Komatsubara et al. |
| 5,826,144 A | 10/1998 | Takenaka et al. |

(Continued)

FOREIGN PATENT DOCUMENTS

| JP | 2013-198129 | 9/2013 |
| JP | 2015228177 | * 12/2015 |
| JP | 2017-033540 | 2/2017 |

OTHER PUBLICATIONS

Machine Translation in English of JP Pub 2015-228177 to Kato Hiroyuki.*

(Continued)

*Primary Examiner* — Haris Sabah
(74) *Attorney, Agent, or Firm* — IPUSA, PLLC

(57) ABSTRACT

An image forming apparatus includes an engine controller configured to control an operation of the image forming apparatus; an image processing controller including a constant log storage configured to temporarily store a log of the engine controller; a network controller configured to store the log, which is stored in the constant log storage, in another device via a network or in a storage of the image forming apparatus, according to a command from the engine controller; a communication line configured to communicably couple the engine controller to the image processing controller, and to communicably couple the image processing controller to the network controller; and an exclusive-use communication line configured to communicably couple the engine controller to the network controller, and to be used to report the command from the engine controller to the network controller.

8 Claims, 8 Drawing Sheets

(51) Int. Cl.
*G06F 13/42* (2006.01)
*G03G 15/00* (2006.01)
*G03G 21/12* (2006.01)
*H04N 1/00* (2006.01)

(52) U.S. Cl.
CPC ....... *G06F 13/4282* (2013.01); *G03G 15/502* (2013.01); *G03G 21/12* (2013.01); *G06F 3/1286* (2013.01); *G06F 2213/0026* (2013.01); *H04N 1/0009* (2013.01)

(56) References Cited

U.S. PATENT DOCUMENTS

| | | | |
|---|---|---|---|
| 5,897,243 A | 4/1999 | Komatsubara et al. | |
| 8,059,299 B2 | 11/2011 | Sugishita et al. | |
| 8,250,291 B2 | 8/2012 | Ohno | |
| 8,718,493 B2 | 5/2014 | Nagata | |
| 8,724,161 B2 | 5/2014 | Ohno | |
| 8,880,407 B2 | 11/2014 | Ohno et al. | |
| 9,389,573 B2 | 7/2016 | Okada | |
| 9,429,909 B2 | 8/2016 | Shirai et al. | |
| 9,832,334 B2 | 11/2017 | Miura et al. | |
| 2010/0265530 A1* | 10/2010 | Takechi | G06F 3/1239 358/1.14 |
| 2010/0272459 A1* | 10/2010 | Kobayashi | G03G 15/2039 399/69 |
| 2011/0032568 A1* | 2/2011 | Takahashi | G06F 3/1239 358/1.15 |
| 2019/0384523 A1* | 12/2019 | Nagumo | G06F 3/0673 |

OTHER PUBLICATIONS

NPL search "Printer Engine Controller Transmit Log Information to Server" on Google/Patents and USPTO.Library.*

* cited by examiner

IMAGE FORMING APPARATUS INCLUDING A CONSTANT LOG STORAGE

CROSS-REFERENCE TO RELATED APPLICATION

The present application is based on and claims priority under 35 U.S.C. § 119 to Japanese Patent Application No. 2019-045257, filed on Mar. 12, 2019, the contents of which are incorporated herein by reference in their entirety.

BACKGROUND OF THE INVENTION

1. Field of the Invention

The present invention relates to an image forming apparatus.

2. Description of the Related Art

In the related art, in an electronic device such as an image forming apparatus, it is known that, by acquiring log information of an engine control unit and storing the log information in a non-volatile memory or the like, it is possible to analyze the situation before and after an error or malfunction has occurred.

Patent Document 1 discloses a configuration including a log storage substrate for the purpose of retaining the log of an engine control unit even when the engine control unit resets the central processing unit (CPU).

Patent Document 1: Japanese Unexamined Patent Application Publication No. 2017-033540

SUMMARY OF THE INVENTION

According to one aspect of the present invention, there is provided an image forming apparatus including an engine controller configured to control an operation of the image forming apparatus; an image processing controller including a constant log storage configured to temporarily store a log of the engine controller; a network controller configured to store the log, which is stored in the constant log storage, in another device via a network or in a storage of the image forming apparatus, according to a command from the engine controller; a communication line configured to communicably couple the engine controller to the image processing controller, and to communicably couple the image processing controller to the network controller; and an exclusive-use communication line configured to communicably couple the engine controller to the network controller, and to be used to report the command from the engine controller to the network controller.

DETAILED DESCRIPTION OF THE PREFERRED EMBODIMENTS

Figure 1:
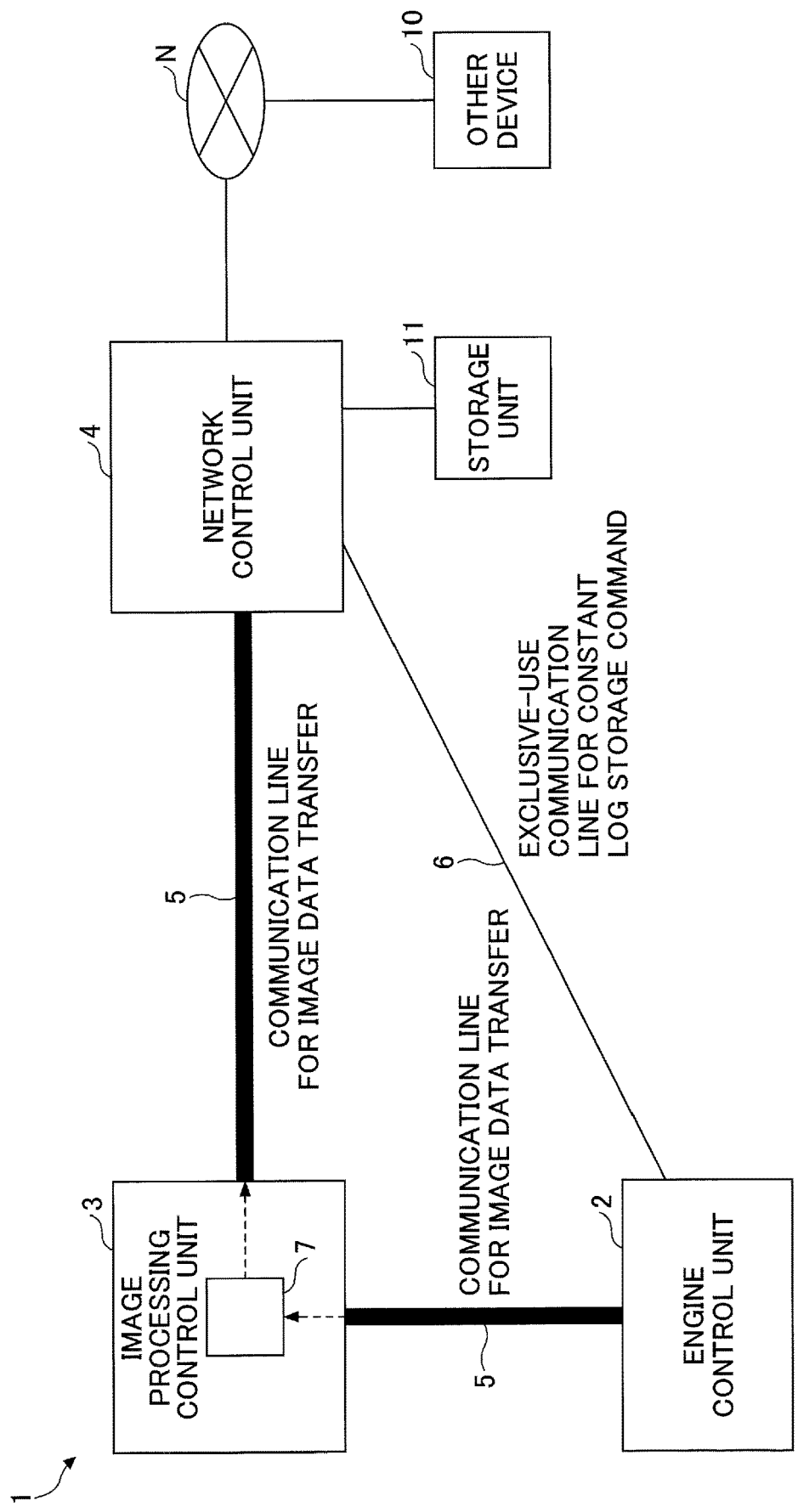
FIG. 1 is a functional block diagram of an image forming apparatus according to an embodiment of the present invention.

In a log storage technology of the related art, there has been a problem of an increasing cost due to the addition of a memory, an application specific integrated circuit (ASIC), and the like, for example, installing an expensive and large capacity non-volatile memory in the engine control unit or installing a substrate exclusively used for log storage.

A problem to be addressed by an embodiment of the present invention is to minimize the increasing cost and to implement constant storage of the log of the engine control unit.

Hereinafter, embodiments will be described with reference to the accompanying drawings. In order to facilitate the understanding of the description, the same elements in the drawings are denoted by the same reference numerals as much as possible, and overlapping descriptions are omitted.

Embodiment

An embodiment will be described with reference to FIGS. 1 to 5. First, the configuration of an image forming apparatus 1 according to an embodiment will be described with reference to FIG. 1. FIG. 1 is a functional block diagram of the image forming apparatus 1 according to an embodiment.

As illustrated in FIG. 1, the image forming apparatus 1 includes an engine control unit 2, an image processing control unit 3, a network control unit 4, a communication line 5, and an exclusive-use communication line 6.

The engine control unit 2 performs control with respect to paper sheet conveyance, image formation, printing, fixing, and the like, and prints image data transferred from the image processing control unit 3 on a paper sheet. According to the present embodiment, the engine control unit 2 creates a log of various operations described above and outputs the log to the image processing control unit 3 via the communication line 5. Here, the log of the engine control unit 2 includes information such as recording information representing the number of times of printing or the like, and the log is used for failure prediction or malfunction analysis. Further, the engine control unit 2 reports, to the network control unit 4 via the exclusive-use communication line 6, that the log information has been output.

The image processing control unit 3 performs various kinds of image processing such as converting image data (print data from a personal computer (PC) or the like, scanner read image data, or the like) transmitted from the network control unit 4 into an image format that can be printed. The image processing control unit 3 transfers the image data after processing to the engine control unit 2.

According to the present embodiment, the image processing control unit 3 includes a constant log storage unit 7 for temporarily storing the log information of the engine control unit 2, and the log information received from the engine control unit 2 is stored in in the constant log storage unit 7.

The network control unit 4 receives print data from another device such as a PC via a network N and transfers the received print data to the image processing control unit 3. According to the present embodiment, in response to a command from the engine control unit 2, the network control unit 4 transfers the log information of the engine control unit 2 stored in the constant log storage unit 7 of the image processing control unit 3, to another device 10 such as a server on the network N, thereby storing the log information of the engine control unit 2.

The communication line 5 communicably couples the engine control unit 2 to the image processing control unit 3, and also communicably couples the image processing control unit 3 to the network control unit 4. The communication line 5 is a communication line for transferring image data or print data, and because the data size of the transferred data is large, a communication line having high communication speed and high reliability is used, such as a communication line of the PCI Express (PCIe) standard.

The exclusive-use communication line 6 communicably couples the engine control unit 2 to the network control unit 4. The exclusive-use communication line 6 is a line exclusively used for transmitting, by the engine control unit 2 to the network control unit 4, a report that the log information of the engine control unit 2 stored in the constant log storage unit 7 of the image processing control unit 3 is to be transferred to and stored in an external device such as a server on the network N.

For example, the exclusive-use communication line 6 is used by the engine control unit 2 for giving a command to the network control unit 4 to accept the log stored in the constant log storage unit 7, immediately before the CPU resets due to an abnormal state of the engine control unit 2. The exclusive-use communication line 6 may also serve as an existing communication line (for example, an Input/Output (IO) port), or may be a newly added exclusive-use communication line. Further, in the example illustrated in FIG. 1, the exclusive-use communication line 6 is configured to directly couple the engine control unit 2 to the network control unit 4; however, depending on reasons concerning the configuration of the substrate and the like, the exclusive-use communication line 6 may be configured to couple the engine control unit 2 to the network control unit 4 via the image processing control unit 3.

The constant log storage unit 7 is a storage device for storing the log from the engine control unit 2. The log stored in the constant log storage unit 7 is transferred to the network control unit 4 according to a command from the engine control unit 2.

Note that in a case where the image forming apparatus 1 is a Multifunction Peripheral (MFP) and is provided with a scanner function, the read image data may be received from a scanner control unit inside the apparatus and transferred to the image processing control unit 3.

Further, the log information of the engine control unit 2 may be stored in a storage unit 11, such as a non-volatile memory (a hard disk drive (HDD), a solid state drive (SSD), or the like) built in the image forming apparatus 1, or an external storage unit, other than the other device 10 such as a server on the network N.

The engine control unit 2, the image processing control unit 3, and the network control unit 4 may be physically configured as a computer device or a circuit board including a central processing unit (CPU), a main storage device such as a Random Access Memory (RAM) and a Read-Only Memory (ROM), a communication module that is a data transmission/reception device, an auxiliary storage device, and the like. The above-described functions of the engine control unit 2, the image processing control unit 3, and the network control unit 4 are implemented by loading predetermined computer software in the hardware such as the CPU, the RAM, or the like to operate a communication module or the like under the control of the CPU, and by reading and writing data in the RAM or the auxiliary storage device. Further, for example, the constant log storage unit 7 of the image processing control unit 3 according to the present embodiment may be implemented by using a part of an existing image processing memory of the image processing control unit 3, or may be implemented by adding a non-volatile memory for constant logs to the substrate of the image processing control unit 3. Further, the constant log storage unit 7 may be implemented by coupling an external storage device to the image processing control unit 3.

Figure 2:
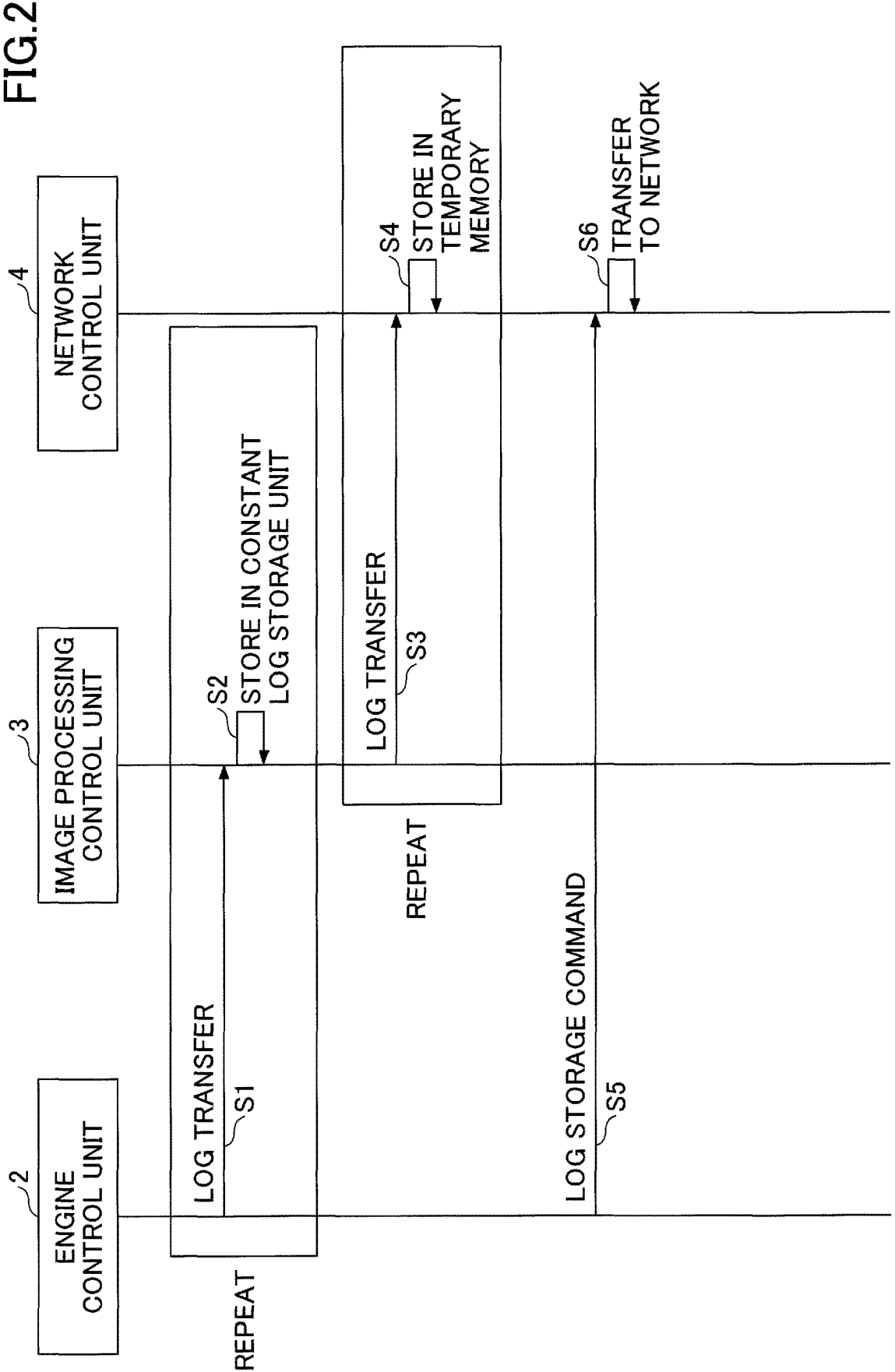
FIG. 2 is a sequence diagram of a log storage process performed by the image forming apparatus according to an embodiment of the present invention.

Referring to FIG. 2, a log storage process performed by the image forming apparatus 1 according to an embodiment will be described. FIG. 2 is a sequence diagram of a log storage process performed by the image forming apparatus 1 according to an embodiment.

In step S1, the engine control unit 2 transfers a log to the image processing control unit 3. The log may be transferred every time a log is generated, or the log may be cached in the engine control unit 2 and transferred in on a fixed size basis (for example, 128 bytes). However, in the latter case, from the viewpoint of preventing a situation of failing to acquire a log, the fixed size is preferably small.

In step S2, the image processing control unit 3 stores the log transferred from the engine control unit 2 in the constant log storage unit 7.

The above-described steps S1 and S2 are repeated until the volume of the log stored in the constant log storage unit 7 reaches the size specified as a system (for example, 1 MB).

In step S3, when the volume of the log stored in the constant log storage unit 7 reaches the specified size, the image processing control unit 3 transfers the log to the network control unit 4.

Figure 8:
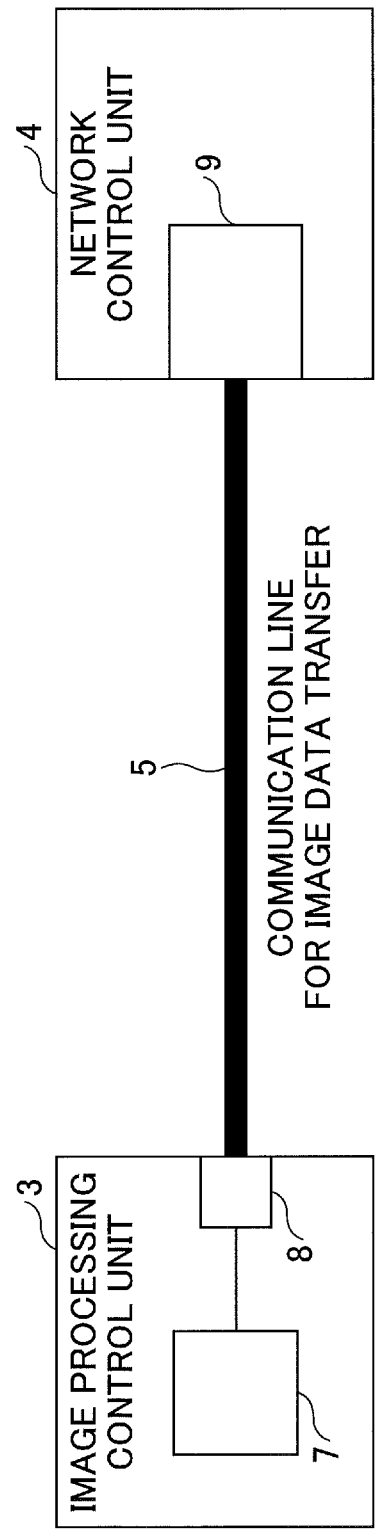
FIG. 8 is a schematic diagram illustrating the method of transferring the log of modified example 2 according to an embodiment of the present invention.

In step S4, the network control unit 4 stores the log transferred from the image processing control unit 3 in a temporary memory 9 (see FIG. 8).

The above-described steps S3 and S4 are repeated until the engine control unit 2 reports a log storage command to the network control unit 4.

In step S5, the engine control unit 2 reports a log storage command to the network control unit 4. This report may use existing command communication via the communication line 5 or may use the exclusive-use communication line 6.

In step S6, the network control unit 4 transfers the log to the other device 10, such as a server on the network N, or stores the log in the storage unit 11, such as a non-volatile memory (a HDD, a SSD, or the like) in the network control unit 4.

When the engine control unit 2 is activated, the above-described steps S1 to S6 are repeated. Note that when the engine control unit 2 is down, for example, when the image forming apparatus 1 is in an energy saving mode, the above-described steps are not executed.

Here, a problem of an image forming apparatus of the related art will be described. In the image forming apparatus of the related art, in the engine control substrate, a CPU for engine control, a memory such as a RAM, and the like are is mounted; however, for the purpose of cost reduction, only a memory having the minimum memory size for operating the engine is mounted.

Further, there has been a control command (log transmission command) for transmitting a log from the engine control unit to the network control unit; however, because the communication line is low-speed, it has been necessary to transmit and receive control commands, other than the log transmission command, with priority higher than that of the log transmission command, in order to cause the engine control unit and the network control unit to operate in cooperation with each other to perform the sequence operations during printing, warming up, shifting to energy saving, and the like.

Accordingly, a log has been acquired by transmitting a log transmission command to the network control unit, for acquiring the most recent partial log until the failure has occurred, limiting to the log of the period when the engine has stopped for a certain time period after a paper jam or after an error.

However, even if the phenomenon within the engine control, such as a paper jam, an error, or the like, can be captured from the logs, the amount of logs that can be collected is limited, and, therefore, there are no logs that can be used to determine the essential cause of the phenomenon; resulting in a problem that the analysis has been difficult.

Further, because a log cannot be collected during printing, in the case of a failure where the engine does not stop abnormally, such as a case of an unintended productivity decrease, formation of abnormal images, or the like, the log cannot be acquired, resulting in a problem that the analysis is prolonged.

Next, when the engine software becomes out of control and the CPU of the engine control unit is reset, it is necessary to identify the cause of the CPU reset by retroactively analyzing the logs.

However, when the engine control unit is reset, with the log stored in the RAM of the engine control unit, it is only possible to understand the processing situation immediately before the CPU is reset, and a log that can provide a hint for identifying the cause of the CPU reset is often not collected, resulting in a problem that the analysis is prolonged.

Furthermore, after the engine control unit resets the CPU, the synchronization of the control command communication between the engine control unit and the network control unit is lost, resulting in a problem that the log concerning CPU reset cannot be transmitted from the engine control unit to the network control unit.

In the related art such as Patent Document 1, in order to solve the above-described problem, there is known a technology in which an expensive and large capacity non-volatile memory is mounted in the engine control unit or a substrate exclusively used for storing logs is mounted; however, this technology has the problem that the cost increases due to the addition of a memory, ASIC, and the like.

Further, even in cases where the related art such as that of Patent Document 1 is applied, the log of the engine control unit uses a low-speed communication line for transmitting and receiving control commands between the engine control unit and the network control unit, and, therefore, the amount of logs that can be transferred has been limited. Further, the engine control unit is a low-specification CPU and has a small memory size, and, therefore, it has not been possible to temporarily store a large amount of logs, and particularly, when the CPU of the engine control unit is reset, it has not been possible to transfer a sufficient amount of logs required for analysis.

In order to solve the above problem of the limitation in the amount of logs, for example, by adding, to the engine control unit, a connector (Local Area Network (LAN), Wireless Fidelity (Wi-Fi), etc.) for directly accessing the network, it will be possible to constantly store logs; however, even by this method, the cost will be significantly increased.

On the other hand, the image forming apparatus 1 according to the present embodiment includes the engine control unit 2 that controls operations of the image forming apparatus 1; the image processing control unit 3 that includes the constant log storage unit 7 that temporarily stores the log of the engine control unit 2; the network control unit 4 that stores the log, which is stored in the constant log storage unit 7, in the other device 10 via the network N or in the storage unit 11 of the image forming apparatus 1, according to a command from the engine control unit 2; the communication line 5 that communicably couples the engine control unit 2 to the image processing control unit 3 and communicably couples the image processing control unit 3 to the network control unit 4; and the exclusive-use communication line 6 that communicably couples the engine control unit 2 to the network control unit 4 and that is used for reporting a command from the engine control unit 2 to the network control unit 4.

The image processing control unit 3 has a sufficient memory capacity even in the existing configuration for performing the image processing function of the related art, and, therefore, in the image processing control unit 3, it is easy to secure a memory area that can be used as the constant log storage unit 7. Thus, in the image forming apparatus 1 according to the present embodiment, the image processing control unit 3 is provided with the constant log storage unit 7 for temporarily storing the log of the engine control unit 2, and, therefore, only the minimum hardware configuration is added and the software control is changed, so that it is possible to minimize the increase in the cost of hardware. Further, the constant log storage unit 7 can constantly store the logs of the engine control unit 2, and, therefore, it is possible to acquire log information that is useful for analyzing the situation when a malfunction occurs.

Further, in the image forming apparatus 1 according to the present embodiment, when the log stored in the constant log storage unit 7 reaches a predetermined size, the image processing control unit 3 transmits the log to the network control unit 4 via the communication line 5. The network control unit stores the log received from the image processing control unit 3 in the temporary memory 9, and stores the log stored in the temporary memory 9 in the other device 10 or the storage unit 11 in response to receiving a command from the engine control unit 2 via the communication line 5 or the exclusive-use communication line 6.

By the above configuration, the frequency of the log transfer from the image processing control unit 3 to the network control unit 4 can be reduced, and the log can be efficiently transferred. Further, the network control unit 4 does not immediately output the log received from the image processing control unit 3, but waits for a command from the engine control unit 2, and, therefore, the log information can be stored at an appropriate timing.

Further, in the present embodiment, it is preferable that the communication line of the PCIe standard is used as the communication line 5. Accordingly, a communication speed sufficient for transmitting the log of the engine control unit 2 to the image processing control unit 3 can be secured, and, therefore, the log can be transferred to the image processing control unit 3 by the high-speed communication line 5, and the log is temporarily stored in the constant log storage unit 7 (large capacity memory) in the image processing control unit 3, so that all of the logs can be constantly stored without failing to acquire a log. Note that in the related art in which a communication line having a lower speed than that of the communication line 5 according to the present embodiment is used, the log amount transmitted from the engine control unit has been reduced and the log transfer timing has been controlled (for example, when the communication amount is high during printing, the log transfer is not performed, and when the printing is stopped such as when the door is opened, the log transfer is performed); however, in the present embodiment, such measures of the related art are not necessary.

Figure 3:
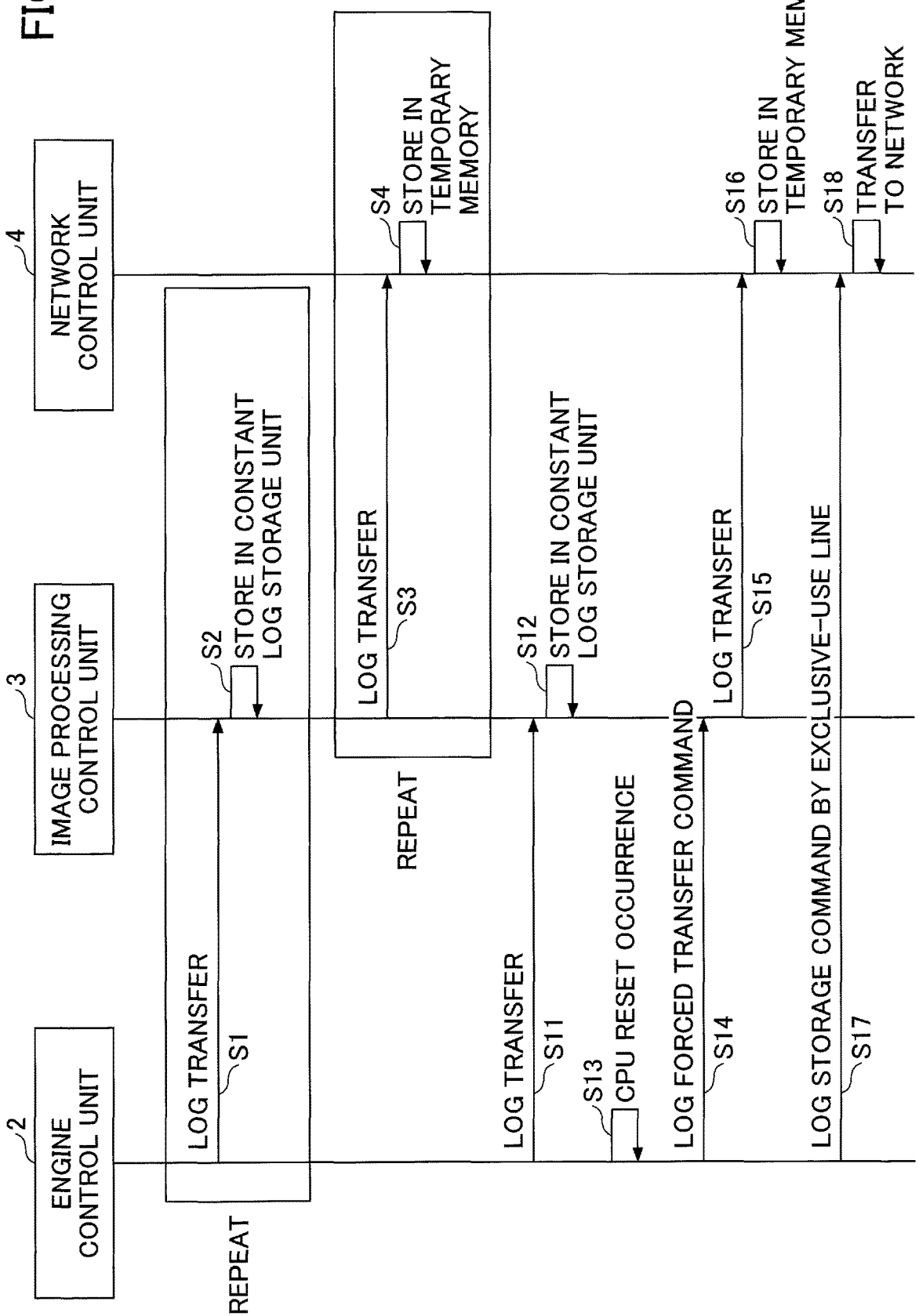
FIG. 3 is a sequence diagram of a log storage process when the central processing unit (CPU) in an engine control unit is reset according to an embodiment of the present invention.

FIG. 3 is a sequence diagram illustrating a log storage process at the time when the reset of the CPU of the engine control unit 2 occurs. The processes of steps S1 to S4 are the same as those in FIG. 2, and, therefore, descriptions thereof will be omitted.

After performing steps S1 to S4, in step S11, the engine control unit 2 transfers the log to the image processing control unit 3, and in step S12, the image processing control unit 3 stores the log transferred from the engine control unit 2 in the constant log storage unit 7. At this stage, the volume of the log stored in the constant log storage unit 7 has not reached the specified size.

In step S13, the CPU reset of the engine control unit 2 occurs. At this time, the log that has not been transferred to the network control unit 4 is retained in the constant log storage unit 7 in the image processing control unit 3.

In step S14, the engine control unit 2 instructs the image processing control unit 3 to forcibly transfer the log.

In step S15, the image processing control unit 3 transfers the remaining log to the network control unit 4.

In step S16, the network control unit 4 stores the log transferred from the image processing control unit 3 in the temporary memory 9.

In step S17, the engine control unit 2 gives a log storage command to the network control unit 4 by using the exclusive-use communication line 6. This is because the CPU reset of the engine control unit 2 disables the usage of the existing command communication between the engine control unit 2 and the network control unit 4.

In step S18, the network control unit 4 transfers the log to a server on the network or stores the log in a non-volatile memory (a HDD, a SSD, or the like) in the network control unit 4.

Note that the process illustrated in FIG. 3 is an example in which, when the CPU of the engine control unit 2 is reset, the log that has not been transferred to the network control unit 4 is remaining in the constant log storage unit 7 in the image processing control unit 3; however, when there are no logs remaining, the above-described steps S15, S16, and S18 are not performed.

As described above, according to the present embodiment, when the CPU of the engine control unit 2 is reset, the image processing control unit 3 transmits the log stored in the constant log storage unit 7 to the network control unit 4 via the communication line 5, and the engine control unit 2 transmits a command to the network control unit 4 via the exclusive-use communication line 6. The network control unit 4 stores the log received from the image processing control unit 3 in the temporary memory 9, and in response to the received command, the network control unit 4 stores the log, which is stored in the temporary memory 9, in the other device 10 via the network N or in the storage unit 11 of the image forming apparatus 1.

As described above, the exclusive-use communication line 6 for transmitting a constant log storage command is disposed between the engine control unit 2 and the network control unit 4 and, therefore, even in a state in which the CPU of the engine control unit 2 is reset and the existing communication between the engine control unit 2 and the network control unit 4 cannot be established (a state in which communication is not possible), the log stored in the constant log storage unit 7 of the image processing control unit 3 can be reliably stored.

Figure 4:
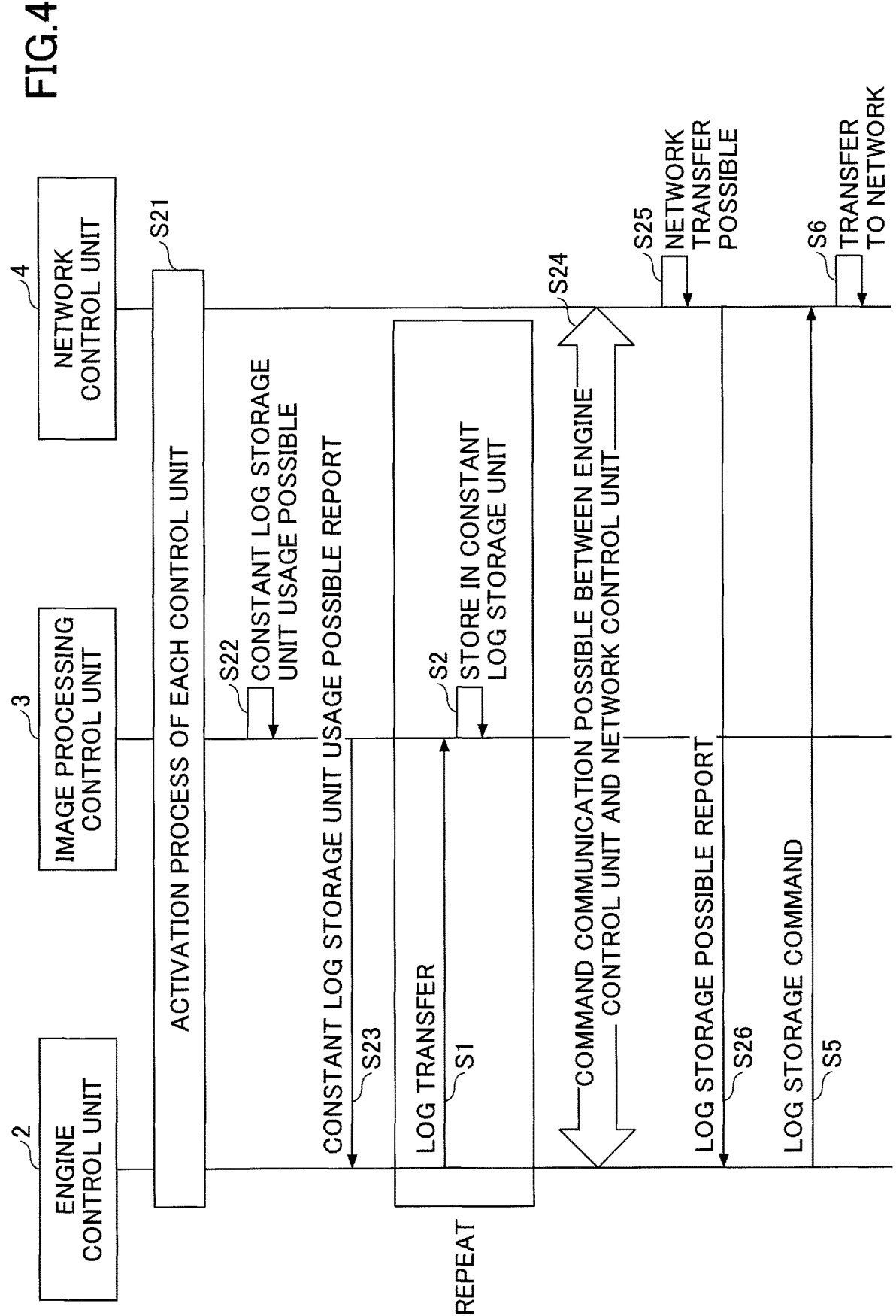
FIG. 4 is a sequence diagram of a log storage process at the time of switching to power ON or at the time of returning from the energy saving mode by the image forming apparatus according to an embodiment of the present invention.

FIG. 4 is a sequence diagram of a log storage process at the time of switching to power ON or at the time of returning from the energy saving mode by the image forming apparatus 1.

In step S21, at the time of switching to power ON or at the time of returning from the energy saving mode, the process of activating the engine control unit 2, the image processing control unit 3, and the network control unit 4 is performed.

In response to the usage of the constant log storage unit 7 becoming possible in step S22, in step S23, the image processing control unit 3 sends a "constant log storage unit usage possible report" to the engine control unit 2. Note that when "the state in which usage of the constant log storage unit 7 becomes possible" is included in "the state in which usage of the image processing control unit 3 (including the constant log storage unit 7) becomes possible", there is no need to separately provide a particular "constant log storage unit usage possible report" as in step S23, and an existing state report will suffice.

In step S23 and onwards, the engine control unit 2 is capable of transferring a log to the image processing control unit 3, and the processes of steps S1 and S2 described in FIG. 2 are performed; however, the log storage command to the network control unit 4 cannot be given.

Thereafter, in step S24, when command communication between the engine control unit 2 and the network control unit 4 becomes possible, and in step S25, when the network control unit 4 becomes capable of transmitting a log to the network (or usage of a non-volatile memory becomes possible), in step S26, the network control unit 4 transmits a log storage possible report to the engine control unit 2.

After the engine control unit 2 receives the log storage possible report by command communication, the processes of steps S5 and S6 described in FIG. 2 can be executed, and the network control unit 4 transfers the log to the network.

As described above, in the present embodiment, at the time of switching to power ON or at the time of returning from the energy saving mode by the image forming apparatus 1, from the timing when the engine control unit 2 becomes capable of accessing the constant log storage unit 7 according to the initialization sequence process performed by the engine control unit 2, the log storage in the image processing control unit 3 starts. Further, after the engine control unit 2 becomes capable of communicating a control command to the network control unit 4 and storage of logs by the network control unit 4 becomes possible, the image processing control unit 3 transmits the log in the constant log storage unit 7 to the network control unit 4.

By the above configuration, at the time of switching to power ON or at the time of returning from the energy saving mode by the image forming apparatus 1, the constant storage of the log of the engine control unit 2 can be restarted at an appropriate timing.

Figure 5:
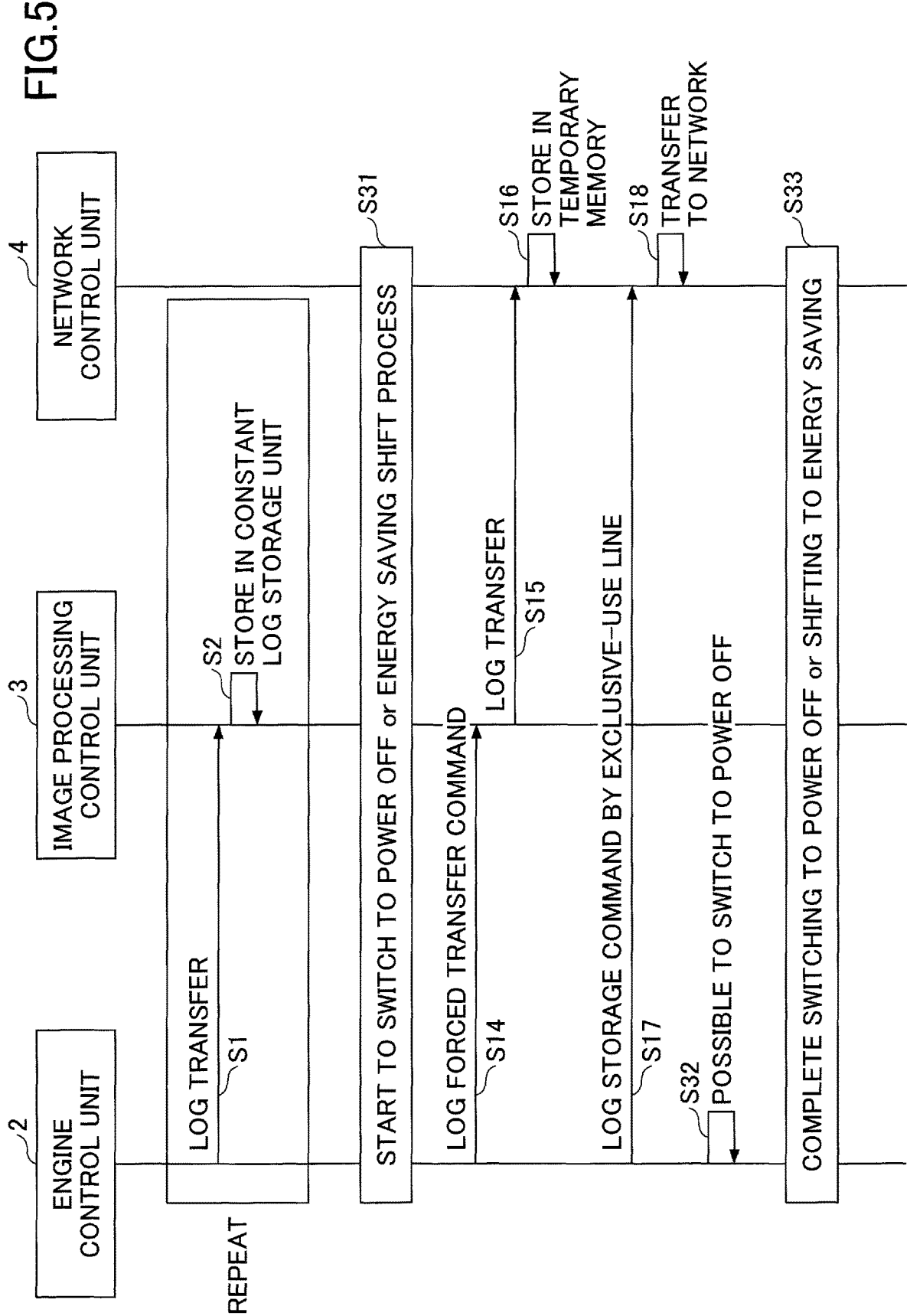
FIG. 5 is a sequence diagram of a log storage process at the time of switching to power OFF or at the time of shifting to the energy saving mode by the image forming apparatus according to an embodiment of the present invention.

FIG. 5 is a sequence diagram of a log storage process performed at the time of switching to power OFF or at the time of shifting to the energy saving mode by the image forming apparatus 1.

When the processes of steps S1 and S2 described in FIG. 2 are executed, for example, as a button on the operation panel of the image forming apparatus 1 is pressed, in step S31, the engine control unit 2, the image processing control unit 3, and the network control unit 4 start to switch to power OFF or start an energy saving shifting process. At this time, in the constant log storage unit 7 in the image processing control unit 3, the log that has not been transferred to the network control unit 4 is remaining.

Therefore, in order to store the remaining log, the processes of steps S14 to S18 of FIG. 3 are executed, and the remaining log is transferred via the network.

In step S32, as soon as there are no more remaining logs, the engine control unit 2 determines that it is possible to switch to power OFF or to shift to the energy saving mode, and in step S33, the engine control unit 2, the image processing control unit 3, and the network control unit 4 complete the switching to power OFF or the energy saving shift process.

As described above, in the present embodiment, at the time of switching to power OFF or at the time of shifting to the energy saving mode by the image forming apparatus 1, the engine control unit 2 switches to power OFF after the network control unit 4 stores the log, which is stored in the constant log storage unit 7, in the other device 10 or the storage unit 11. By this configuration, even at the time of switching to power OFF or at the time of shifting to the energy saving mode by the image forming apparatus 1, it is possible to prevent a situation of failing to acquire a log of the engine control unit 2.

Modified Example 1

Figure 6:
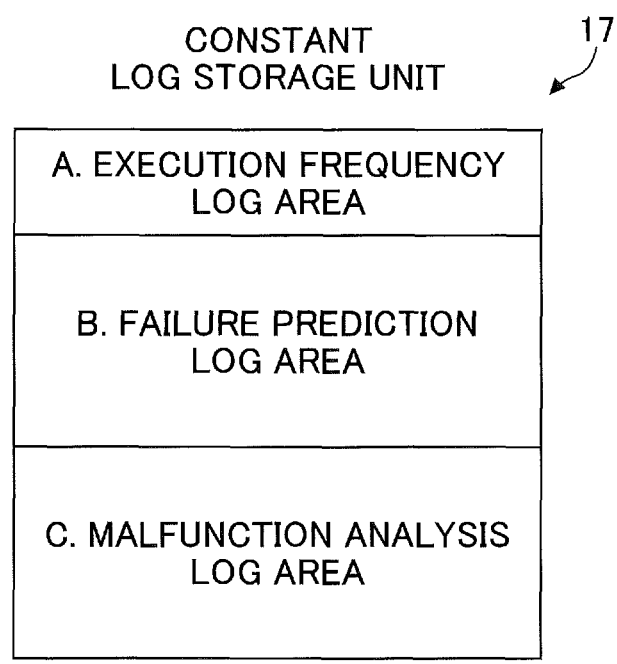
FIG. 6 is a schematic diagram illustrating the configuration of a constant log storage unit of modified example 1 according to an embodiment of the present invention.

Modified example 1 will be described with reference to FIGS. 6 and 7. FIG. 6 is a schematic diagram illustrating the configuration of a constant log storage unit 17 according to modified example 1. As illustrated in FIG. 6, the constant log storage unit 17 of modified example 1 is divided into areas according to a plurality of different purposes. Here, a description is given of a case where the constant log storage unit 17 is divided into three areas, i.e., "A. Execution frequency log area", "B. Failure prediction log area", and "C. Malfunction analysis log area".

Figure 7:
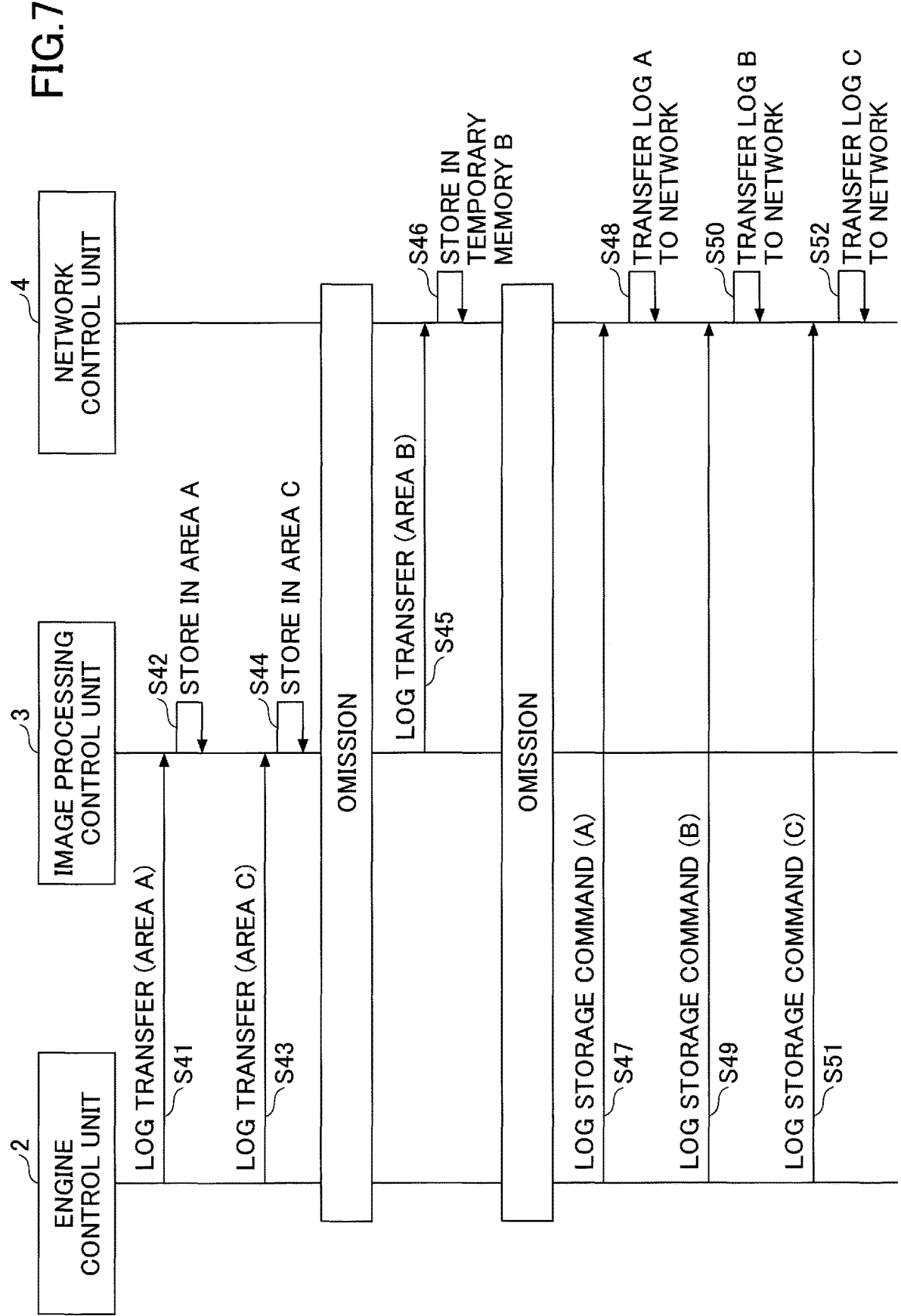
FIG. 7 is a sequence diagram of a log storage process of modified example 1 according to an embodiment of the present invention.

FIG. 7 is a sequence diagram of a log storage process according to modified example 1.

The difference from the above-described embodiment (mainly FIG. 2) is to determine which area among areas A to C is to be the target of the log transfer and the log storage command. For example, in the log transfer process of step S41, the engine control unit 2 specifies the area A of the constant log storage unit 17 as the transfer destination of the log, and in step S42, the image processing control unit 3 stores the received log in the area A. Similarly, in the log transfer process of step S43, the engine control unit 2 specifies the area C of the constant log storage unit 17 as the transfer destination of the log, and in step S44, the image processing control unit 3 stores the received log in the area C. In steps S45 and S46, the log stored in the area B is transferred to be temporarily stored in a temporary memory B.

Further, in the log storage command of step S47, the engine control unit 2 specifies the log of the area A as the log to be stored, and in step S48, the network control unit 4 transfers the log in the area A of the constant log storage unit 17 to the network. Similar processes are performed with respect to the other areas in steps S49 to S51.

Accordingly, the storage processes can be controlled according to the order of the priority levels of the logs. For example, when the server on the network N or a non-volatile memory (a HDD, a SSD, or the like) in the network control unit 4 becomes full, and logs cannot be stored additionally, or when the network is interrupted, it is possible to retain the log with a higher priority level than the other logs.

Modified Example 2

Modified example 2 will be described with reference to FIG. 8. FIG. 8 is a schematic diagram illustrating a method for transferring a log according to modified example 2. As in modified example 2 illustrated in FIG. 8, the log transfer between the image processing control unit 3 and the network control unit 4 may be performed by Direct Memory Access (DMA). In this case, the log data stored in the constant log storage unit 7 is DMA-transferred to the temporary memory 9 inside the network control unit 4 by the specified size.

In the case of performing DMA transfer, the image processing control unit 3 includes a direct memory access controller (DMAC) 8. When the log transfer is performed from the image processing control unit 3 to the network control unit 4, the DMAC 8 sets the "address of the temporary memory 9 in the network control unit 4", which is the transmission destination, and the "log size to be transferred", and executes the DMA transfer.

Similar to a general DMAC, the "address of the temporary memory 9 in the network control unit 4" that is the transfer transmission destination, the "address of the constant log storage unit 7" that is the transmission source, and the "log size to be transferred", may be specified.

As described above, the present embodiment has been described with reference to specific examples. However, the present embodiment is not limited to these specific examples. Specific examples to which design modifications have been made as appropriate by those skilled in the art, are also encompassed by the present embodiment, as long as the features of the present embodiment are included. The elements provided in each of the specific examples described above, and the arrangement, conditions, shapes, and the like thereof, may be modified as appropriate without being limited to those exemplified. The elements provided by the above-described specific examples may vary in combination as appropriate, unless there is a technical inconsistency.

According to one embodiment of the present invention, it is possible to minimize a cost increase and to implement constant storage of the log of the engine control unit.

The image forming apparatus is not limited to the specific embodiments described in the detailed description, and variations and modifications may be made without departing from the spirit and scope of the present invention.

What is claimed is:

1. An image forming apparatus comprising:
an engine controller configured to control an operation of the image forming apparatus;
an image processing controller including a constant log storage configured to temporarily store a log of the engine controller;
a network controller configured to store the log, which is stored in the constant log storage, in another device via a network or in a storage of the image forming apparatus, according to a command from the engine controller;

a communication line configured to communicably couple the engine controller to the image processing controller, and to communicably couple the image processing controller to the network controller; and an exclusive-use communication line configured to communicably couple the engine controller to the network controller, and to be used to report the command from the engine controller to the network controller, wherein at a time when the image forming apparatus switches to power on or at a time when the image forming apparatus returns from an energy saving mode, the engine controller performs an initialization sequence process so that the engine controller becomes capable of accessing the constant log storage, and at a timing when the engine controller becomes capable of accessing the constant log storage, the engine controller starts to store the log in the image processing controller, and upon detecting that the engine controller has become capable of communicating a control command including the command, with the network controller and that the network controller has become capable of storing the log, the image processing controller transmits the log, which is stored in the constant log storage, to the network controller.

2. The image forming apparatus according to claim 1, wherein the image processing controller transmits the log to the network controller via the communication line upon detecting that the log stored in the constant log storage has reached a predetermined size, and the network controller stores the log received from the image processing controller in a temporary memory, and stores the log, which is stored in the temporary memory, in the another device or in the storage upon receiving the command from the engine controller via the communication line or the exclusive-use communication line.

3. The image forming apparatus according to claim 1, wherein the image processing controller transmits the log, which is stored in the constant log storage, to the network controller via the communication line upon detecting that a central processing unit (CPU) included in the engine controller is reset, the engine controller transmits the command to the network controller via the exclusive-use communication line, and the network controller stores the log received from the image processing controller in a temporary memory, and, upon receiving the command, the network controller stores the log, which has been stored in the temporary memory, in the another device or in the storage.

4. The image forming apparatus according to claim 1, wherein at a time when the image forming apparatus switches to power off or at a time when the image forming apparatus shifts to an energy saving mode, the network controller stores the log, which is stored in the constant log storage, in the another device or in the storage, and subsequently, the engine controller switches to power off.

5. The image forming apparatus according to claim 1, wherein the log of the engine controller includes a plurality of types of logs that are stored separately from each other in the constant log storage, and after the network controller stores one log among the plurality of types of logs in the another device or in the storage, the image processing controller transmits another log among the plurality of types of logs to the network controller.

6. The image forming apparatus according to claim 1, wherein the image processing controller transfers, by Direct Memory Access (DMA), log data stored in the constant log storage to a memory in the network controller, by a specified size of the log data.

7. The image forming apparatus according to claim 1, wherein the communication line is a communication line of a PCI Express (PCIe) standard.

8. An image forming apparatus comprising:

an engine controlling means for controlling an operation of the image forming apparatus;

an image processing controlling means including a constant log storing means for temporarily storing a log of the engine controlling means;

a network controlling means for storing the log, which is stored in the constant log storing means, in another device via a network or in a storing means of the image forming apparatus, according to a command from the engine controlling means;

a communication line for communicably coupling the engine controlling means to the image processing controlling means, and for communicably coupling the image processing controlling means to the network controlling means; and an exclusive-use communication line for communicably coupling the engine controlling means to the network controlling means, and for being used for reporting the command from the engine controlling means to the network controlling means, wherein at a time when the image forming apparatus switches to power on or at a time when the image forming apparatus returns from an energy saving mode, the engine controlling means performs an initialization sequence process so that the engine controlling means becomes capable of accessing the constant log storing means, and at a timing when the engine controlling means becomes capable of accessing the constant log storing means, the engine controlling means starts to store the log in the image processing controlling means, and upon detecting that the engine controlling means has become capable of communicating a control command including the command, with the network controlling means and that the network controlling means has become capable of storing the log, the image processing controlling means transmits the log, which is stored in the constant log storing means, to the network controlling means.

* * * * *